United States Patent
Spartiotis et al.

(10) Patent No.: US 7,605,375 B2
(45) Date of Patent: Oct. 20, 2009

(54) MULTI-FUNCTIONAL RADIATION/PHOTON IDENTIFYING AND PROCESSING APPLICATION SPECIFIC INTEGRATED CIRCUIT AND DEVICE

(75) Inventors: Konstantinos Spartiotis, Espoo (FI); Tom Schulman, Monninkyla (FI); Anssi Leppanen, Helsinki (FI)

(73) Assignee: Oy Ajat Ltd., Espoo (FI)

( * ) Notice: Subject to any disclaimer, the term of this patent is extended or adjusted under 35 U.S.C. 154(b) by 9 days.

(21) Appl. No.: 11/790,542

(22) Filed: Apr. 26, 2007

(65) Prior Publication Data

US 2008/0265169 A1 Oct. 30, 2008

(51) Int. Cl.
G01T 1/24 (2006.01)

(52) U.S. Cl. .................. 250/370.09; 250/370.14; 377/53; 377/73; 378/114

(58) Field of Classification Search .............. None
See application file for complete search history.

(56) References Cited

U.S. PATENT DOCUMENTS

| | | | | |
|---|---|---|---|---|
| 4,131,798 | A * | 12/1978 | Reddy et al. | 250/328 |
| 5,166,959 | A * | 11/1992 | Chu et al. | 377/20 |
| 6,248,990 | B1 | 6/2001 | Pyyhtia et al. | |
| 6,927,396 | B2 * | 8/2005 | Vydrin et al. | 250/367 |
| 2003/0194047 | A1 * | 10/2003 | Murphy | 377/116 |
| 2004/0017224 | A1 * | 1/2004 | Tumer et al. | 327/51 |
| 2005/0098735 | A1 * | 5/2005 | Heismann | 250/370.12 |

OTHER PUBLICATIONS

M. Campbell et al, "A Readout Chip for a 64×64 Pixel Matrix with 15-bit Single Photon Counting", Jun. 1998, pp. 751-753, IEEE Transactions on Nuclear Science, vol. 45, No. 3.

Erik H.M. Heijne et al, "Development fo Silicon Pixel Detectors: An Introduction", 1989, pp. 467-471, Nuclear INstruments and Methods in Physics Research A275.

B. Mikulec et al, "X-ray imaging using single photon processing with semiconductor pixel detectors", 2003, pp. 282-286, Nuclear Instruments & Methods in Physics Research, Section A.

C. Da Via et al, "Imaging of visible photons using hybrid silicon pixel detectors", Aug. 1994, pp. 414-419, Nuclear Instruments & Methods in Physics Research, Section A.

C. Da Via et al, "Gallium arsenide pixel detectors for medical imaging" 1997, pp. 148-151, Nuclear Instruments & Methods in Physics Research, Section A.

(Continued)

*Primary Examiner*—David P Porta
*Assistant Examiner*—Yara B Green
(74) *Attorney, Agent, or Firm*—Young & Thompson

(57) ABSTRACT

A radiation device includes a detector connected to a multi-functional radiation identifying and processing application specific integrated circuit. The detector includes a plurality of individual imaging cells, each imaging cell generating a charge in response to incident radiation events and outputting the generated charge at an imaging cell output. The application specific integrated circuit includes a different circuit connected respectively to a corresponding one of the imaging cell outputs, each circuit receiving and processing the generated charge received from the corresponding one imaging cell output. Each circuit includes a preamplifier for generating a voltage or current amplitude in response to the received charge, a counter, and a mode logic configured for setting the counter to perform, selectively, at least two of a) photon counting, b) analog to digital conversion of the one of the voltage amplitude and the current amplitude, and c) timing measurement of incident radiation events.

11 Claims, 8 Drawing Sheets

OTHER PUBLICATIONS

P. Fischer et al, "A counting pixel readout chip for imaging applications", Sep. 23, 1997, pp. 1-10, Centre de Physique des Particules, IN2P3-CNRS, Case 907.

P. Fischer et al, "A Counting CdTe Pixel Detector for hard X-ray and γ-ray Imaging", May 2001, 6 pages, Universitat Bonn, Physikalisches Institut, submitted to IEEE Transactions on Nuclear Science.

E. Beuville et al, "A 2D Smart Pixel Detector for Time Resolved Protein Crystallography", Jun. 1996, pp. 1243-1247, IEEE Transactions on Nuclear Science, vol. 43, No. 3.

C. Ronnqvist et al, "Development of a Digital X-ray Imaging Detector", 1996, pp. 1607-1611, Dept. of Radiation Sciences, Uppsala University, Uppsala, Sweden. 0-7803-3180-X.

C. Ronnqvist et al, "A 64-Channel Pixel Readout Chip for Dynamic X-ray Imaging", pp. 351-355, Dept. of Radiation Sciences, Uppsala University, Sweden. 0-7803-3534-1/97 1997IEEE.

"Semiconductor micropattern pixel detectors: a review of the beginnings", 45 pages, 2001, Elsevier Science B.V., doi: 10.1016/SO168-9002(01)00340-0.

* cited by examiner

Figure 4(a)
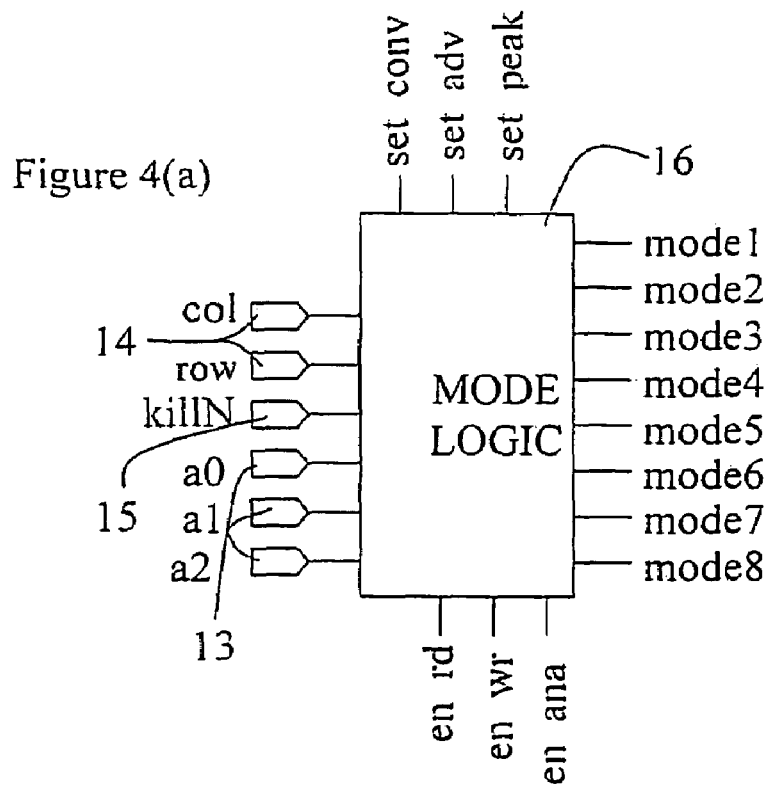
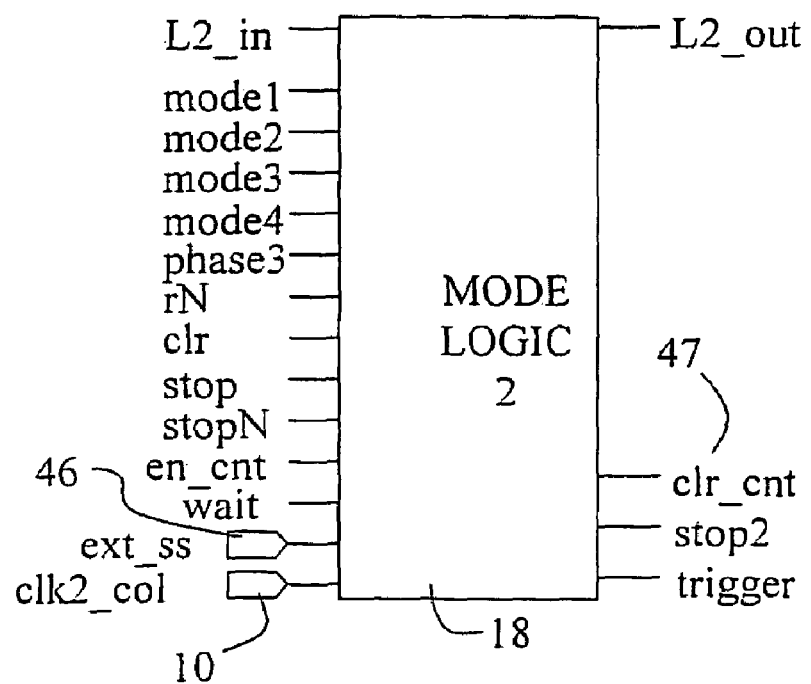
Figure 4(b)

MULTI-FUNCTIONAL RADIATION/PHOTON IDENTIFYING AND PROCESSING APPLICATION SPECIFIC INTEGRATED CIRCUIT AND DEVICE

BACKGROUND OF THE INVENTION

1. Field of the Invention

The present invention relates to digital radiation imaging. In particular, the invention relates to a radiation device including a multi-functional radiation, e.g., x/gamma ray, identifying and processing application specific integrated circuit (ASIC) for single photon processing imaging with CMOS and solid state pixel detector technology.

2. Description of Related Art

In digital radiation imaging, the spatially varying intensity of a radiation field of interest is recorded by discrete pixels of an image receiving device.

In conventional digital radiography, the intensity is measured as the total energy deposited by the radiation in each pixel of the image receiver.

In other imaging applications, such as in nuclear medicine or back scatter imaging, the number of radiation quanta detected or counted defines the image signal instead of the total integrated energy.

The past years have seen a growing interest in this method of photon counting imaging, including in digital radiography due to the fact that ideally both the image signal to noise ratio (SNR) and the contrast can be improved if the signal photons are given equal weight regardless of their energy. This, as well as noise reduction by discrimination of scattered photons falling below a certain energy, are possible in photon counting imaging.

While integration imaging can be realised with rather simple pixel level electronics, photon counting imaging demands a more complicated preamplifier and usually on-pixel comparator-counter circuitry.

More recently ideas of advanced radiation imaging methods have been introduced. These ideas, such as high resolution position sensitive X-ray fluorescence spectroscopy (XRF), energy selective X-ray imaging or 3D position recording of gamma rays for electronic collimation, require even more sophisticated photon processing than discrimination and counting. Advanced photon processing may include, in addition to counting and discrimination, analog signal amplitude recording and readout, on-pixel analog to digital (A/D) conversion and digital amplitude readout, signal timing deduction, sparse readout, dual energy thresholding, etc.

As a method of imaging, photon counting has been most widely utilized in gamma cameras in nuclear medicine. The limitations of the conventional scintillator-photo multiplier gamma cameras in both spatial and energy resolution have motivated the development of photon counting solid state semiconductor pixel detectors. Especially CdTe/CdZnTe small field of view or so called mini gamma cameras have been introduced first based on discrete detector crystals and later on monolithic detectors flip chip bonded to signal readout ASICs to form a hybrid pixel detector. Photon counting semiconductor hybrid pixel detectors have been developed also for X-ray imaging.

Several pixel Application Specific Integrated Circuits intended for photon counting imaging in connection with semiconductor detectors have been designed and manufactured.

In the late eighties M. Campbell, E. H. M. Heijne et al. introduced the idea of using hybrid pixel detectors in high energy physics experiments (E. H. M. Heijne and P. Jarron, Development of silicon pixel detectors: An Introduction, NIM A 275 (467-471), 1989). The pixel ASICs developed for particle tracking were equipped with pixel level preamplifier, signal shaping and discrimination circuitry and with binary output, i.e., at readout each pixel shows either hit or no hit (E. H. M. Heijne, Semiconductor micropattern pixel detectors: a review of the beginnings, NIM A 465 (1-26), 2001).

The binary output pixel ASICs bump bonded to semiconductor detectors were tested also for imaging of visible photons (C. Da Via et al., Imaging of visible photons using hybrid silicon pixel detectors, NIM A 355 (414-419), 1995), and of X-rays and β-particles (C. Da Via et al., Gallium arsenide pixel detectors for medical imaging, NIM A 395 (148-151), 1997).

In 1998 M. Campbell, E. H. M. Heijne et al. published a description of a photon counting pixel ASIC specifically design for imaging applications. The pixel level circuitry now included a 15 bit counter to store the number of photon events present in each pixel during the image acquisition time. This activity lead to the Medipix collaboration (http://medipix.web.cern.ch/MEDIPIX). The Medipix1 chip is claimed to be the first (full size) photon counting ASIC suitable for X-ray imaging (M. Campbell et al., Readout for a 64×64 pixel matrix with 15-bit single photon counting, IEEE Trans. Nucl. Sci., Vol. 45, Issue 3, part 1 (751-753), 1998; B. Mikulec et al., X-ray imaging using single photon processing with semiconductor pixel detectors, NIM A 511 (282-286), 2003). Its successor, the Medipix2, with a pixel size of 55 μm and with 13 bit on-pixel counters is capable of handling count rates up to 1 MHz/pixel. It offers dual energy thresholding (energy window) and is sensitive to both negative and positive signals (http://medipix.web.cern.ch/MEDIPIX).

In 1997 P. Fischer et al. submitted a report (P. Fischer et al., A counting pixel readout chip for imaging applications, NIM A 405 (53-59), 1998) on a photon counting pixel chip with very similar functionalities to those of the Medipix1 circuit. The same group has also published results on photon counting imaging with pixelated CdTe detectors (P. Fischer et al., A counting CdTe pixel detector for hard X-ray and γ-ray imaging, IEEE Trans. Nucl. Sci., Vol. 48, Issue 6, part 3 (2401-2404), 2001).

Photon counting radiation imaging with a hybrid pixel detector comprising on-pixel counters in one to one correspondence with the detector pixels was disclosed in U.S. Pat. Nos. 6,248,990 and 6,355,923 to J. Pyyhtia and K. Spartiotis. A semiconductor imaging device is disclosed that includes an imaging substrate comprising an image cell array of detector cells, each detector cell corresponding to an individual pixel of the image cell array, and which directly generate charge in response to incident high energy radiation, and a counting substrate containing an array of image cell circuits, each image cell circuit being associated with a respective detector cell, the image cell circuit comprising counting circuitry coupled to the respective detector cell, and configured to count plural radiation hits incident on the respective detector cell, wherein the counting substrate is directly connected to the imaging substrate by bump-bonds. This idea is utilized, e.g., in the Medipix chips.

E. Beuville et al. published in June, 1996, a description on a pixel detector bump bonded to a photon counting ASIC with a preamplifier-shaper-discriminator-counter (3 bit) chain on each pixel (E. Beuville et al., A 2D smart pixel detector for time resolved protein crystallography, IEEE Trans. Nucl. Sci., Vol. 17, No. 3 (1217-1247), June 1996).

C. Ronnqvist et al. presented the idea of X-ray imaging with a hybrid pixel detector in 1995 (C. Ronnqvist et al., Development of a digital X-ray imaging detector, IEEE Nuclear Science Symposium and Medical Imaging Conference, Vol. 3, (1607-1611), October 1995), and published experimental results on a photon counting ASIC in 1996 (C. Ronnqvist et al., A 64-channel pixel readout chip for dynamic X-ray imaging, IEEE Nuclear Science Symposium and Medical Imaging Conference, Vol. 1, (351-355), November 1996). The pixel circuit is similar to the Medipix design and to the S image idea with the only significant difference of the pixel counter being analog. The pixel output is a voltage value proportional to the number of photons above the discrimination level instead of a digital number of counts.

However, it is to be noted that apparently the above mentioned systems have had limited success in applications. The main reason is that although the principle of identifying individual x-ray photons, amplifying them and then incrementing a counter has merits, in reality it is not possible to make a reliable imaging device. The main reason is that calibrating such devices has been very difficult; the information of the energy of the photons is lost once a digital count is used to increment the pixel counter and depending on the application one would want to have different treatment of the photon events. What is needed is a flexible x-ray and gamma ray identifying imaging device that is based on a pixelated electronic architecture with enough functionality on each pixel to allow more than one operations depending on what the user wishes to achieve.

SUMMARY OF THE INVENTION

Generally, the invention concerns a radiation device (and related methods) that includes a radiation detector or radiation imaging detector connected to a multi-functional radiation identifying and processing application specific integrated circuit (ASIC).

At the device level, a detector is a device that converts radiation to an electronic signal/charge and then what follows (the ASIC and overall system) may classify the device as radiation detection/monitoring or radiation imaging.

A radiation detector is a detector that is able to detect radiation and provide, generally speaking, information as to the amount/dose and type (energy, isotope, charged/photon radiation) of the radiation. With a radiation detector, one may not be producing an image and may just be obtaining the total dose or type of incident radiation. A radiation imaging detector is a detector that is able to detect radiation in the x-y with certain spatial resolution and produce an image where the value of each pixel in the image is representative of the number of radiation hits in that pixel. With a radiation imaging detector, one may not be aware of the energy of the incident radiation hits and also may not know the type of radiation.

In the present invention, the inventive ASIC provides the ability to do all of the features of a radiation detector and a radiation imaging detector.

The inventive detector includes a plurality of individual imaging cells (pixels), each imaging cell generating a charge (signal) in response to radiation events incident upon the individual imaging cells and outputting the generated charge at an imaging cell output. The application specific integrated circuit includes a different circuit connected respectively to a corresponding one of the imaging cell outputs, each circuit receiving and processing the generated charge received from the corresponding one imaging cell output. Each circuit includes a preamplifier for generating a voltage or current amplitude in response to the received charge, a counter, and a mode logic configured for setting the counter to perform, selectively, at least two of a) photon counting, b) analog to digital conversion of the one of the voltage amplitude and the current amplitude, and c) timing measurement of incident radiation events.

The present invention includes a multi-functional x/gamma ray identifying and processing Application Specific Integrated Circuit. The ASIC detects and processes charges (signals) induced by ionizing radiation in semiconductor detectors, primarily x-rays and gamma rays in the range of 1 keV to greater than 1 MeV.

The inventive ASIC is divided to pixel cells. The number of pixels may be for example 64×32=2048, based on one particular fabrication process. Accordingly, there would be 2048 pixel cells in such an example. In this example such an array is possible using for example a mixed CMOS 0.35 µm process. Other processes are possible within the scope of the current invention, such as BiCMOS, NMOS etc. and processes from 0.08 µm to 1 µm. The pixel pitch is in this example 350 µm, but again, depending on the application and CMOS process used it can be as small as 10 µm. Typically, but without limitation, each pixel cell is to be connected to a corresponding detector pixel by bump bonds or other means. See FIG. 2 showing bump 26 connecting the output of detector pixel 27 to pixel cell 100 of CMOS circuit 25.

The inventive ASIC pixel circuitry comprises a preamplifier, a peak and hold circuit, a comparator, a multi-functional digital counter, logic units for mode and mode phase selection, and digital to analog (D/A) converters and memory elements for amplifier offset and gain tuning.

In accordance with the current invention, a multi-functional counter is provided. The counter is capable of and used not only for event counting but also for signal timing measurements, for digitization of the signal amplitude, and other functionalities.

In an exemplary embodiment each cell of the ASIC has an input which is connected to at least one output of a pixel of a radiation detector or a radiation imaging detector. By way of example, such detectors can be CdTe (Cadmium Telluride), CdZnTe (Cadmium Zinc Telluride), HgI (Mercury Iodide), PbI (Lead Iodide), GaAs (Gallium Arsenide), Ge (Germanium), Si (Silicon) etc. The radiation detectors in these example are generally referred to as direct conversion in that when an x-ray or gamma ray photon, with energies more than 1 keV and typically in the range of 1 keV to 600 keV, impinges thereon, they will convert the energy of the high energy photon directly to an electrical charge ("charge"). This charge is the input to the corresponding cell of the ASIC of the current invention.

Each cell of the ASIC comprises a circuit which includes an amplifier for integrating an input charge and providing an voltage or current amplitude (or otherwise also referred to as pulse), a peak hold circuit, comparator(s), memory elements, digital to analog conversion circuit and a counter. The radiation detector and the ASIC can have multiple cells in typically one to one correspondence (but its not necessary for the purpose of this invention to have one to one correspondence). In such case the ASIC is used not just as a radiation detection readout circuit but as an radiation imaging device readout circuit. In accordance with the current invention there is provided one counter per cell (pixel) with multiple functionalities. The invention provides advantages not seen before and makes possible constructing usable x/gamma ray imaging devices with the ability to identify and process each event (i.e., each x/gamma ray photon or other types of radiation like beta, alpha etc).

By way of example, the invention provides the functionalities of the single counter per radiation detecting or imaging cell/pixel:

In the counting mode the comparator has a constant threshold and a hit is added to the counter each time the preamp output exceeds the threshold.

In the timing mode the counter is started by a radiation event and stopped at the appearance of an external trigger or at counter overflow. When the counter is operated at constant frequency the counter value at readout is directly proportional to the elapsed time between start and stop.

In the A/D conversion mode a voltage ramp is fed into the threshold input of the comparator which compares the ramp value to the analog signal amplitude stored in the peak hold circuit. The counter is started simultaneously with the constant speed voltage ramp. The counter is stopped by the comparator when the voltage ramp reaches the analog amplitude peak. The digital counter value is then proportional to the analog amplitude level.

This feature of utilizing one counter in different modes or functions allows versatile and sophisticated photon processing with very small pixel cells.

A typical three bit mode selecting logic enables eight different modes of operation. Together with appropriate phase and sparse logic, numerous functional options are available, some of which are explained in detail in the description of preferred embodiments. These options include, but are not limited to synchronous counting (all pixels count events and counters are read out and reset sequentially at a constant rate), synchronous digital amplitude recording (all pixel counters operated as A/D converters, full or partial sequential readout and reset), synchronous analog amplitude recording (preamp analog output stored in peak hold and read out sequentially), sparse address readout (hit address recorded by the sparse logic) and sparse timing recording (time elapsed between radiation event and external stop trigger). Different options can be combined sequentially by the phase logic to perform series of functions, e.g., timing-address-digital amplitude or address-analog amplitude, etc. One or more modes are reserved for write-in of amplifier offset and gain tuning data.

BRIEF DESCRIPTION OF DRAWINGS

FIGS. 3-7 show the individual blocks of the invention in enlarged view with the pins labelled.

FIGS. 4a and 4b show the mode logic blocks 16 and 18.

FIG. 7 shows an enlarged view of the analog front end of the pixel cell circuit block diagram.

DESCRIPTION OF PREFERRED EMBODIMENTS

1. Preferred Pixel Cell Diagram

Figure 1:
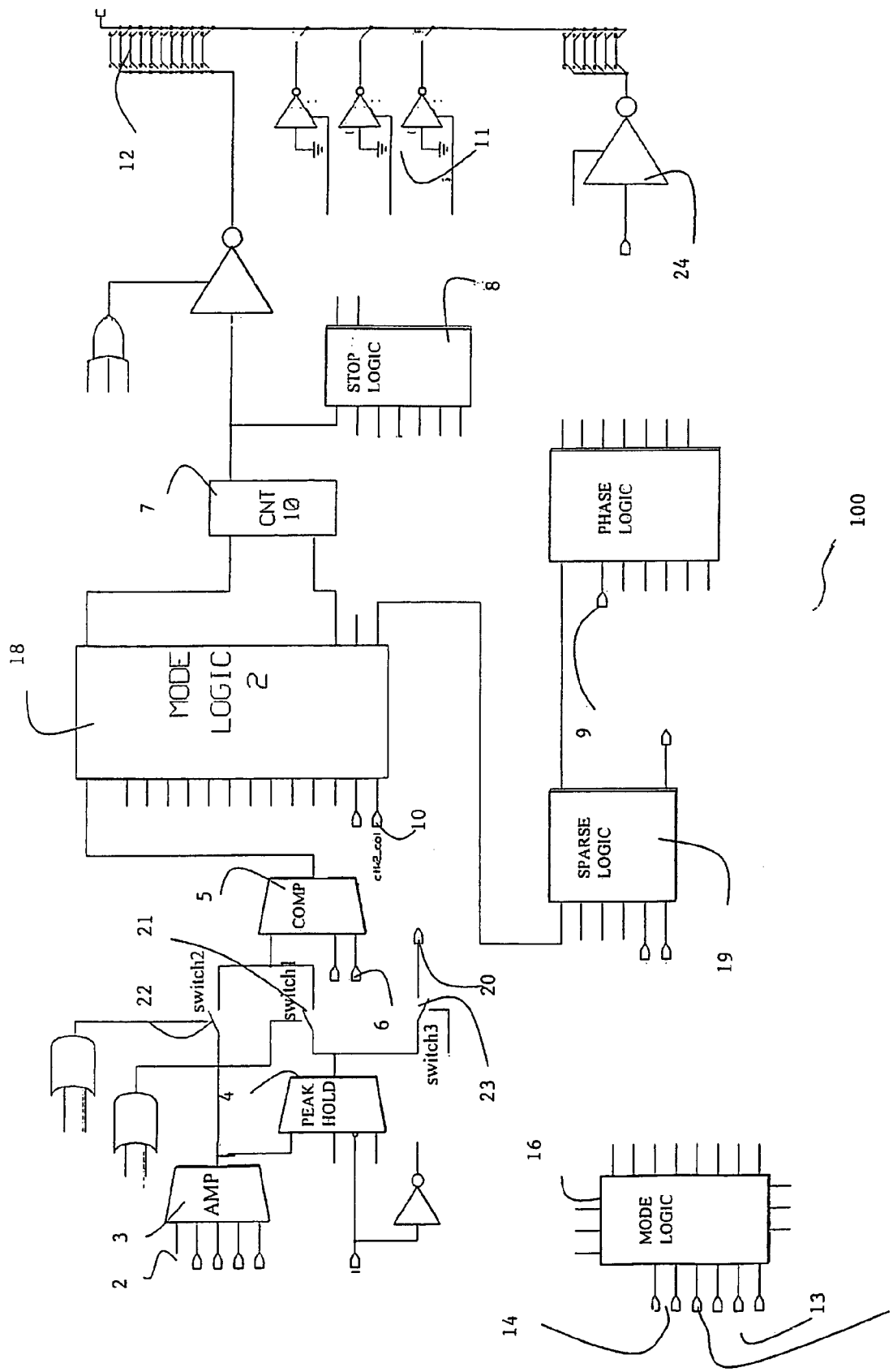
FIG. 1 presents a block diagram of a preferred pixel cell circuit according to the present invention.
Figure 2:
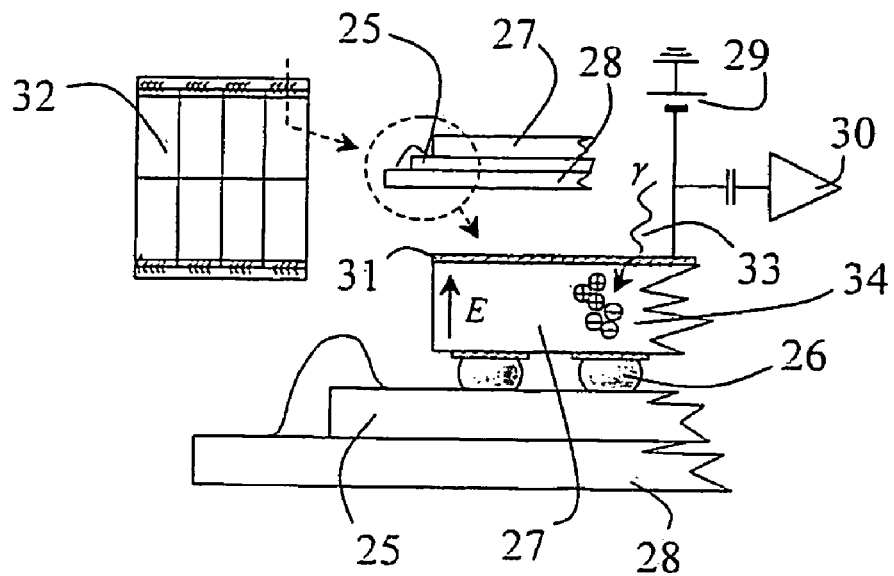
FIG. 2 shows a method of using the CMOS circuit of the current invention in detection and analysis of radiation quanta, i.e., x-ray and gamma ray photons or even charged radiation such as electrons, alpha particles, etc.
Figure 3A:
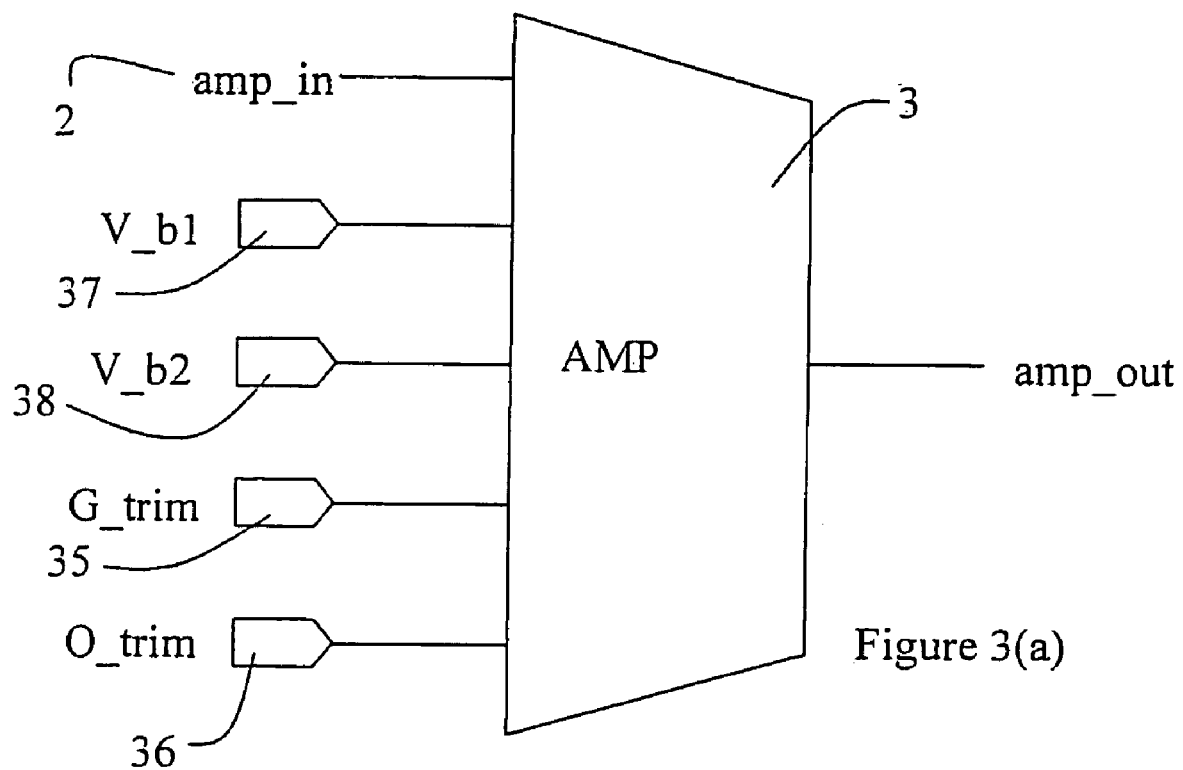
FIG. 3a shows the amplifier block 3. The amp_in pin 2 is connected to a detector pixel. G-trim 35 and O-trim 36 are used for gain and offset tuning of the amplifier. The amplifier operating voltages are provided through pins V_b1 37 and V_b2 38.
Figure 3B:
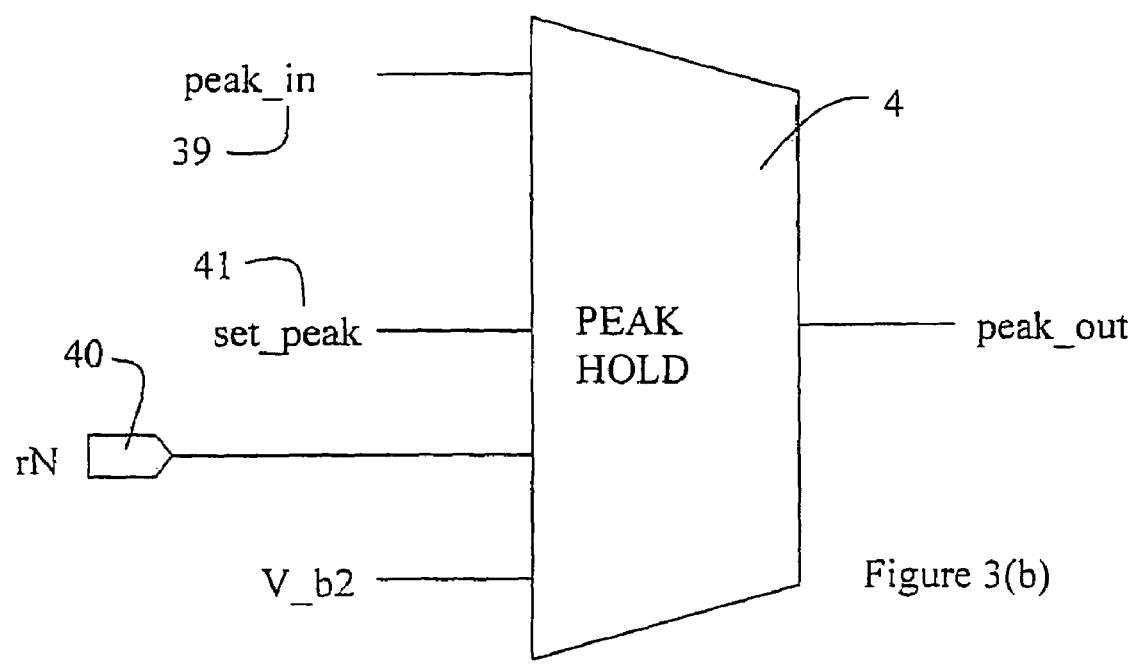
FIG. 3b shows the peak-and-hold circuit block 4. The amplified signal is fed into the peak-hold circuit 4 through the peak_in pin 39. The rN terminal 40 is used for reset. The peak-hold circuit 4 can be set either to the "hold" or to the "pass through" state through the set_peak pin 41.
Figure 3C:
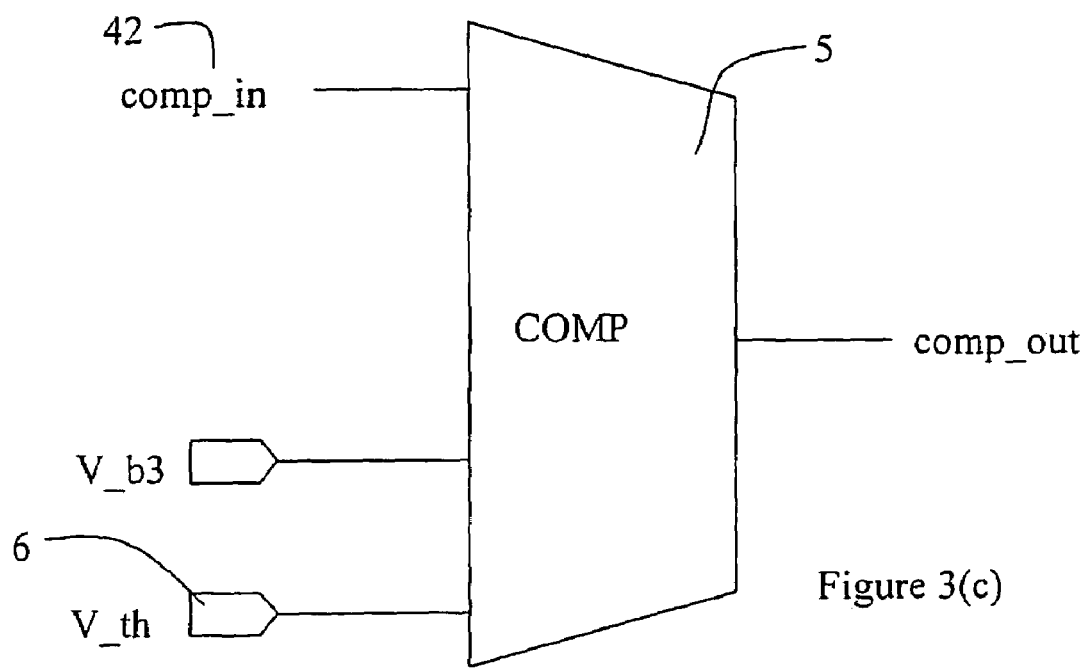
FIG. 3c shows the comparator block 5. The amplified signal is fed into the comparator through the comp_in pin 42 and compared to the threshold value at pin V_th 6.
Figure 4C:
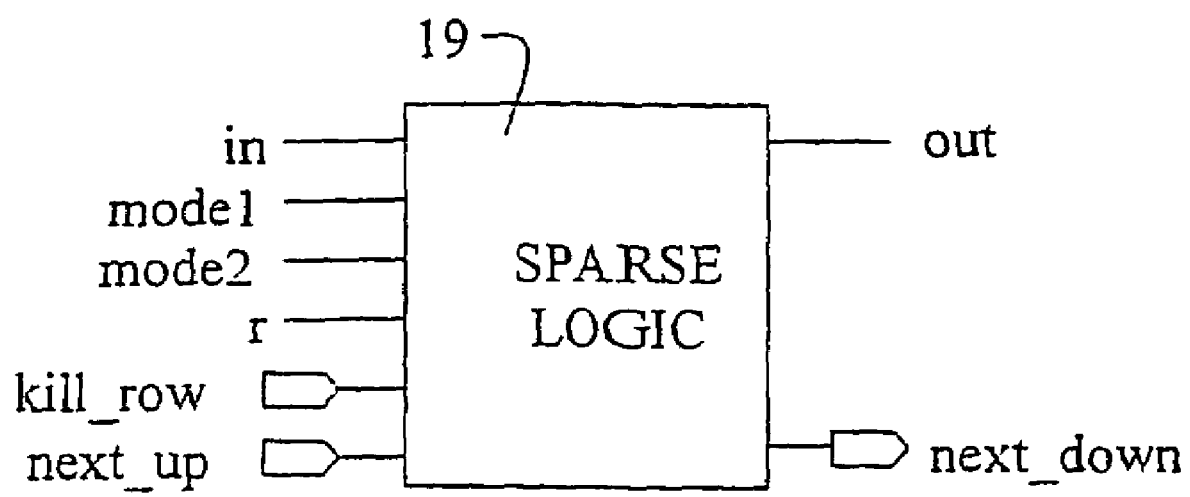
FIG. 4c shows the sparse logic block 19.
Figure 5A:
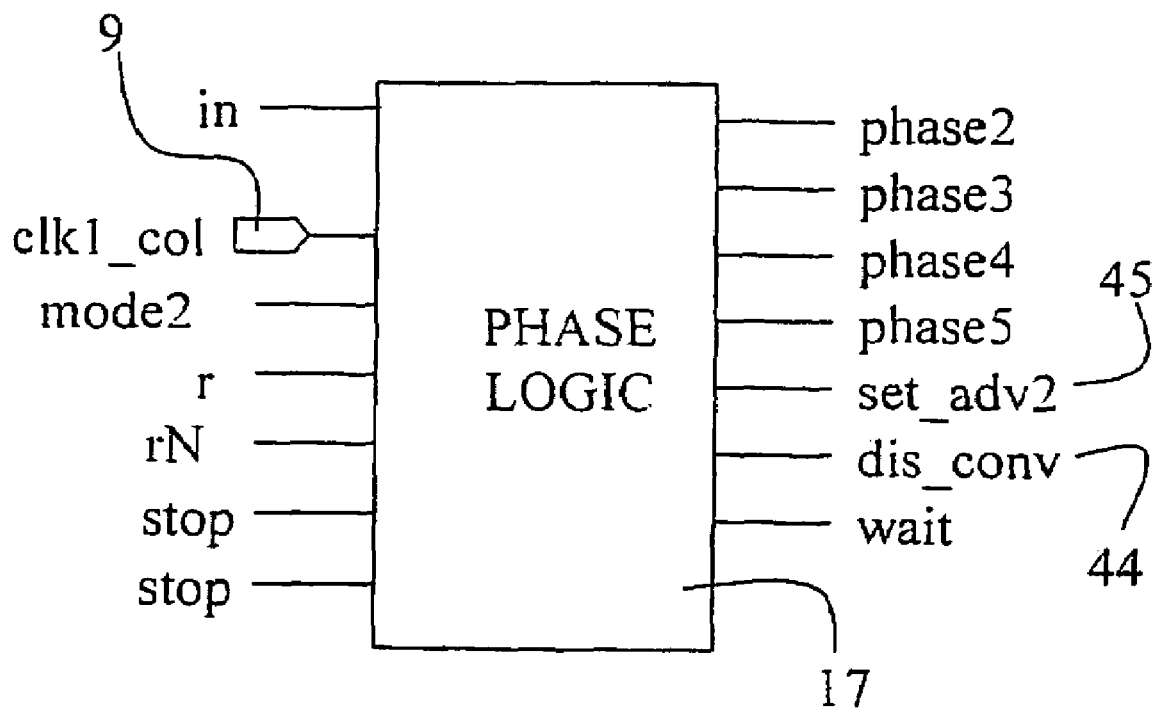
FIGS. 5a and 5b show the phase logic block 17 and the stop logic block 8.
Figure 5B:
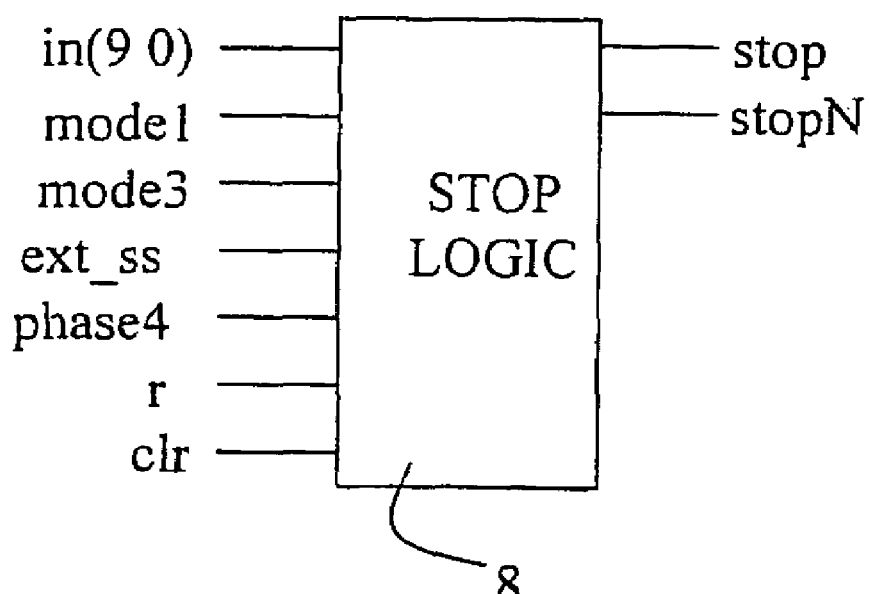
Figure 6A:
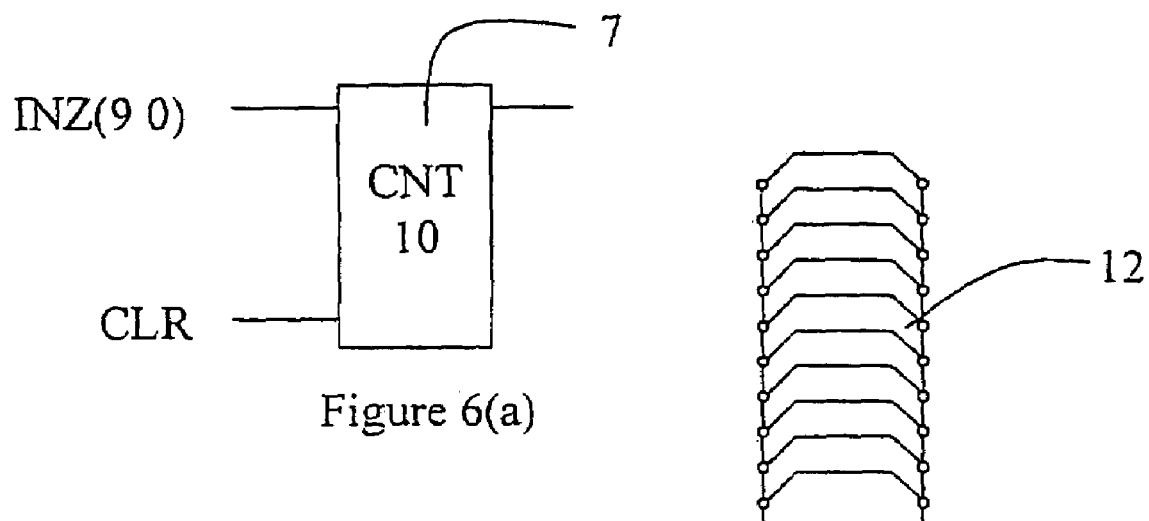
FIG. 6a shows the counter block 7 and FIG. 6b shows the state buffers 11, the common I/O bus 12, and the row address decoder 24.
Figure 6B:
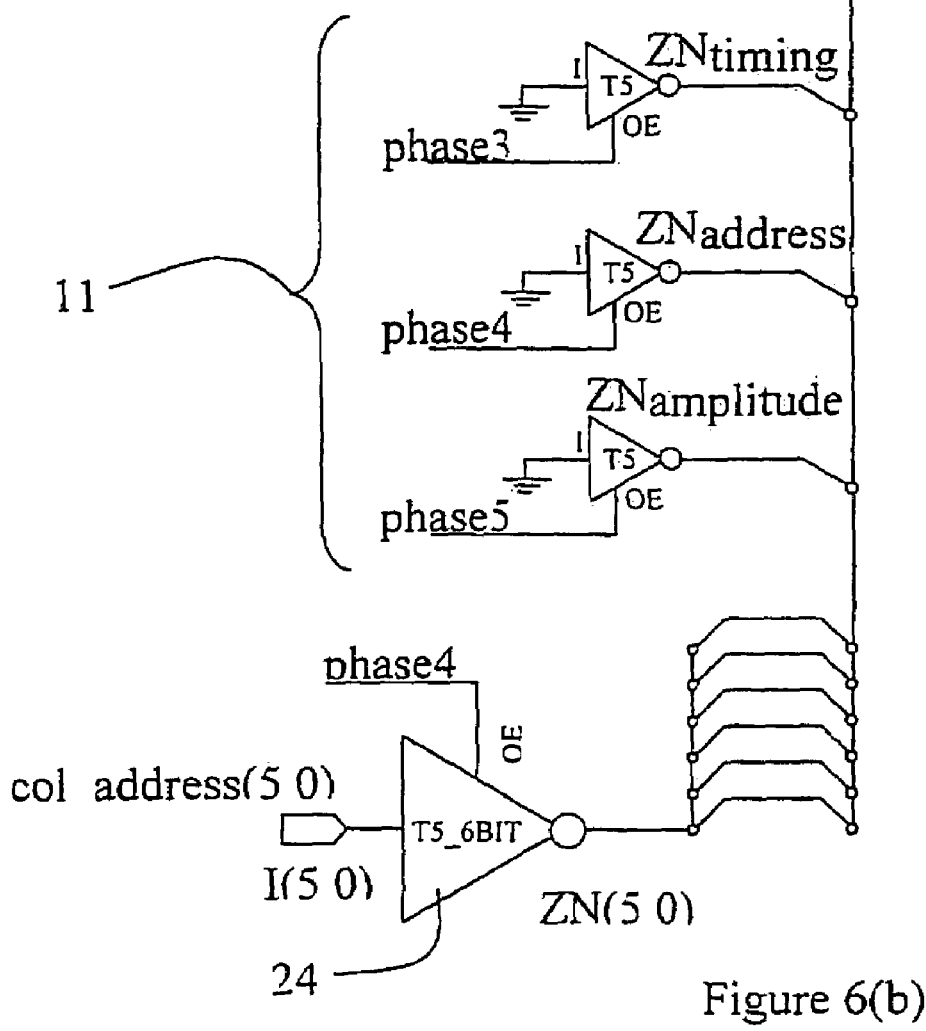
Figure 7:
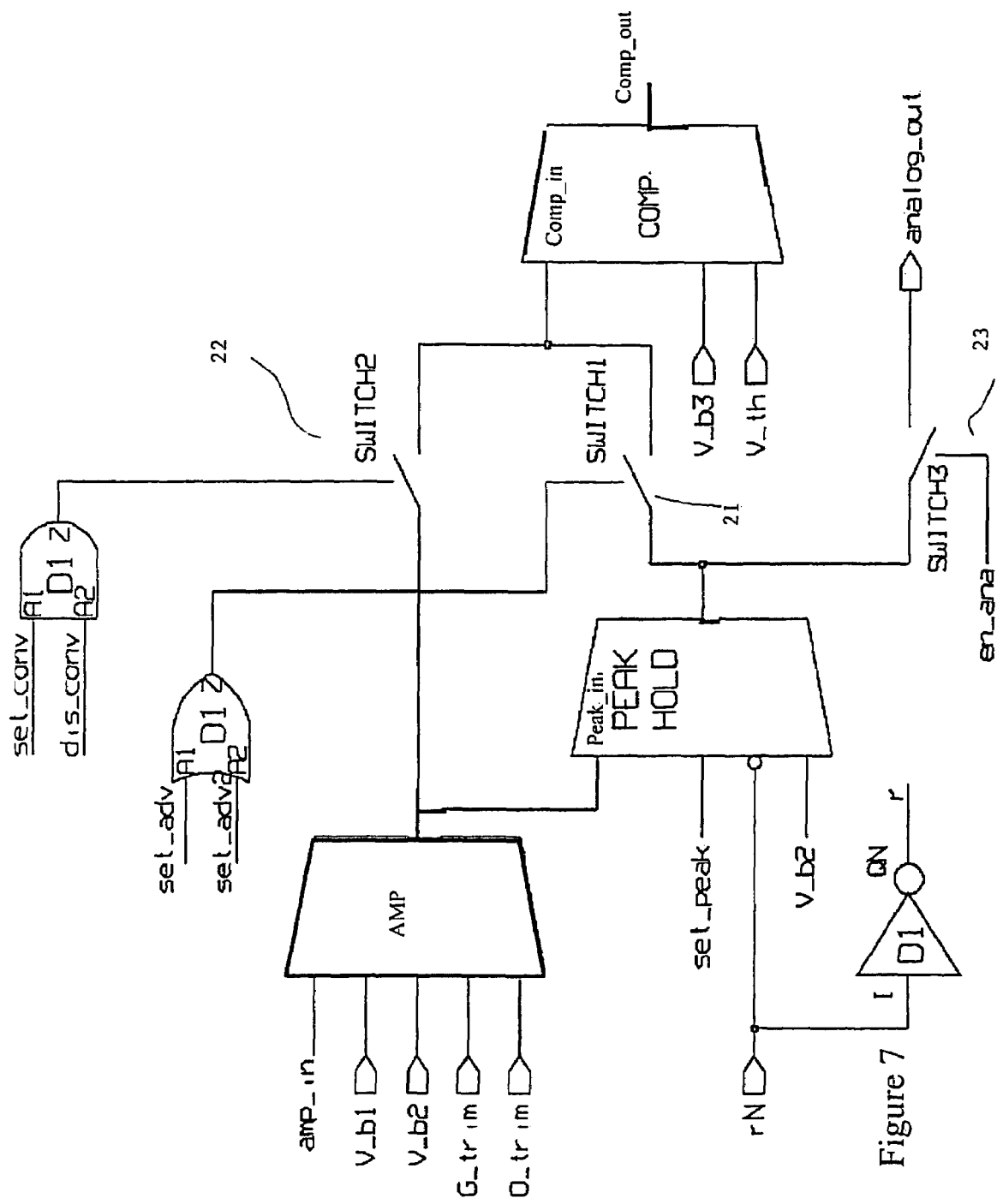

A block diagram of the pixel cell circuit 100 of a preferred embodiment of the present invention is shown in FIG. 1. There is one pixel cell circuit 100 associated with each detector pixel. FIG. 2 shows an overview of an radiation device, i.e., image sensor 32 comprised of imaging cells, i.e., plural detector pixels 27 connected to CMOS circuits 25. CMOS circuits 25 provide plural pixel cell circuits 100 with each detector pixel connected to a corresponding pixel cell circuit via a bump bond 26.

Thus, with reference to FIGS. 1-2, the invention includes a radiation device having a radiation detector or radiation imaging detector connected to a multi-functional radiation identifying and processing application specific integrated circuit. The detector includes a plurality of individual imaging cells 27, each imaging cell generating a charge in response to incident radiation events and outputting the generated charge at an imaging cell output. The application specific integrated circuit includes a different circuit connected respectively to a corresponding one of the imaging cell outputs, each circuit receiving and processing the generated charge received from the corresponding one imaging cell output, via, e.g., bump bond 26. As discussed below, each circuit includes a preamplifier for generating a voltage or current amplitude in response to the received charge, a counter, and a mode logic configured for setting the counter to perform, selectively, at least two of a) photon counting, b) analog to digital conversion of the one of the voltage amplitude and the current amplitude, and c) timing measurement of incident radiation events.

This embodiment can be operated in eight different modes. The variety of modes is made possible by the inventive multi-functional use of the pixel counters located one in each pixel cell. All blocks necessary for the eight modes are shown in FIG. 1. The internal construction of each block is within the skill of the art, and therefore is not discussed in more detail. The individual blocks are shown, in enlarged view with the pins labelled, in FIGS. 3-7.

The pins in the diagrams of FIG. 1 and FIGS. 3-7 marked with an input/output (I/O) terminal sign ➨connect to the next hierarchy of the pixel circuit which is not shown and includes D/A converters and memory elements for amplifier offset and gain trimmingThe pins without terminal signs ➨are internal to the pixel core circuit. For example, the output pin of the mode logic block 16 labeled "mode1" connects to the "mode1" input pins of the blocks mode logic_2 18, sparse logic 19 and stop logic 8. Preferably two clocks 9 and 10 (typically 1 MHz and 100 MHz), are used in the operation of the pixel core.

The pixel circuit is connected to a corresponding semiconductor detector pixel at the input 2 of the charge sensitive preamplifier 3. The preferred preamp is AC coupled with tunable gain and offset. Eight bit D/A converters are favored providing 256 voltage steps for tuning.

The output of the preamplifier 3 is connected to the input of the peak and hold unit 4. The peak and hold unit 4 detects and stores the analog amplitude maximum appearing at the preamplifier 3 output. The peak and hold unit 4 can also be switched to a pass through state in which the peak and hold unit 4 operates as a unity gain amplifier.

The comparator 5 acts as a differential discriminator. The threshold node 6 of the comparator can be switched between a constant voltage and a voltage ramp which are both generated on-chip with an eight bit D/A converter and are common to all channels. The constant threshold is used for discrimination of low energy quanta in the photon counting mode and the ramp is used in the A/D conversion mode.

In this exemplary embodiment, the counter 7 is preferably eight bit and has multiple functionalities, and may be used either a) for photon counting, b) for timing measurement, or c) for A/D conversion and digital amplitude output. The counter is triggered either by a detected radiation hit or by the clock signals. The stop logic 8 prevents counter overflow and provides counter stop in the timing mode.

The three state buffers 11 are used to drive the common I/O bus 12.

The three bit mode logic block 16 (eight preferred modes) generates the required signals to choose one of the operational modes. The three mode selecting bits 13 are common to all pixels. Thus all the pixels are forced to operate identically. With the row and column signals 14 and the killN signal 15 the mode logic block 16 also controls the channel readout and write-in and the channel enable/disable.

The phase logic 17 creates different phases for certain modes to ensure sequential acquisition and readout of the timing, address and amplitude data.

The mode logic_2 block 18 is an interface between the comparator and the counter. The mode logic_2 block defines the start and stop conditions of the counter depending on which mode or mode phase is in operation.

The sparse logic 19 is used in certain modes to switch off all other pixels other than the first pixel detecting an event.

The preferred pixel cell circuit also provides an analog_out line 20 for analog acquisition of the preamp output.

Favored modes of function of the preferred embodiment of the invention are presented below as examples. The versatility and scope of the invention is, however, not limited to these modes. Other modes with different mode phase sequences are possible to realise with the functional blocks described above within the scope of the invention.

In what follows, different functions are explained that can be achieved by utilizing a common circuit element in each pixel. In these examples, the circuit element with the multi-functional processing capability is a counter. However, it is within the scope of the invention to have other circuit elements on each pixel that are able to offer more than one function.

2. Operational Functions

Synchronous Digital Amplitude Recording

The mode logic 16 is configured to open switches 22 and 23 and close switch 21. The peak hold circuit 4 is turned to the hold state. The analog amplitude of a radiation event is stored in the peak hold circuit 4. A voltage ramp is fed to the comparator 5 threshold node 6. The counters 7, of each pixel cell circuit 100, are started by clock 9 simultaneously with the voltage ramp which is raised from the zero level with a predefined speed. The clock speed is limited by the power consumption to typically 1 MHz.

The counters 7 of the pixels with a radiation hit are stopped when the ramp has reached the amplitude value stored in the peak hold of the respective pixel. Since the counting speed of the counter is defined by the known clock frequency the digital counter value at counter stop is directly proportional to the analog voltage signal. With an eight bit counter and a 1 MHz clock, the parallel on-pixel A/D conversion is completed in 256 μsec. Following conversion, the peak hold circuits are reset and a new event detecting period starts (user selectable length). Any events appearing during the conversion period will thus be disregarded (dead time). While waiting for new events, the digital amplitude values are read out sequentially with high speed as defined by clock 10.

This function is used for medium rate (typically up to 50 kHz/pixel) energy dispersive intensity recording and can be utilized, e.g., in position sensitive energy spectroscopy or energy selective imaging. This function is also used for amplifier offset and gain tuning.

Synchronous Counting

The mode logic 16 opens switches 22 and 23 and closes switch 21. The peak hold circuit is in the pass through state. Since the channel has been calibrated (preamp gain and offset tuned) with the peak hold circuit engaged the preamp output is, in order to avoid CMOS mismatch errors, preferably connected to the comparator 5 input through the peak hold 4 rather than through switch 22. The comparator 5 threshold 6 is constant. The counter records all hits exceeding the threshold value. The counting time/readout cycle is defined by the speed of the continuous sequential readout (clock 10, typically 100 MHz). Each counter is reset immediately following readout (no dead time). This function is used for high rate (up to typically 12.5 MHz/pixel) intensity recording, i.e., for photon counting imaging.

Synchronous Analog Amplitude Recording

The mode logic 16 closes switch 23 and opens switches 21 and 22. At an externally defined interval the analog nodes are sequentially read out as driven by clock 9. The A/D conversion is performed off-chip with a high speed high resolution A/D converter. Addressing one pixel for readout always resets the previous pixel. Thus, every pixel is immediately active after readout and events are recorded with practically no dead time the maximum allowed event rate being defined by the readout clock speed. This function is used for low event rate (typically below 0.5 kHz/pixel) high resolution energy dispersive intensity recording with zero dead time. This function is also useful for amplifier performance probing (noise analysis).

Address Recording

The sparse logic 19 is operated to allow only one pixel to be active following a radiation event. The address is decoded row and column wise with six bits in each pixel (row address 24) and five bits in a common column circuit (column address). The address recording is used generally to define a region of interest (ROI) for partial readout of the pixel matrix (e.g., the pixels surrounding the hit pixel) or in combination with, e.g., the timing function to deduce the timing data from one specific pixel with a detected event.

Timing

Switches 21 and 23 are opened and switch 22 is closed by mode logic 16. A hit in a detector pixel triggers the counter which runs until the appearance of an external stop signal or until counter overflow. Since the counting speed of the counter is defined by the known clock frequency the digital counter value at counter stop is directly proportional to the elapsed time after the hit. Signal timing measurements are used, e.g., for coincidence interval definition between different detector units (stop signal from a different detector unit) or for interaction depth estimation of detected gamma rays (stop signal from the back side electrode of the same detector unit).

3. Favored Modes of Function

Eight modes which are combinations of the operational functions described above are preferred by example and can be utilized in a real imaging device. Sequential operation of required tasks within certain modes are ensured by mode phases created and controlled by the phase logic 17.

Mode 1: Single pixel timing, address and digital amplitude recording. Five phases: 1) reset, sparse logic start and time counting, 2) timing data readout, 3) counter reset, 4) address readout and amplitude counting, and 5) amplitude readout.

The Mode logic 16 activates mode 1. The phase logic 17 activates phase 1. The external reset signal rN 40 resets all the flip flops and latches of the logic. The mode logic 16 sets the initial values of the switches of the analog part. Switch 21 and switch 23 are opened and switch 22 is closed. The peak hold circuit 4 is in the "hold" state. The comparator 5 has a fixed threshold voltage.

A hit in the detector triggers the counter 7 and the sparse logic 19. Phase 1 continues until an external stop signal 46 appears or until counter overflow.

Phase 2 is activated. The timing data recorded in the counter 7 as a digital number is read out through the state buffers 11 and the dis_conv signal 44 is latched which opens switch 22.

Phase 3 is activated. The counter 7 is reset and the set_adv2 signal 45 is latched closing switch 21.

Phase 4 is activated. The channel address is read out through the state buffers 11. The address flag bit starts the off-channel ramp generator (8 bit counter+8 bit digital to analog converter (DAC)). Simultaneously clk2 10 restarts the channel counter 7. Phase 4 continues until the ramp reaches the signal held at the comparator 5 resulting in counter stop or until counter overflow.

Phase 5 is activated. The amplitude data stored in the counter 7 is read out through the state buffers 11. The external master reset 40 restarts phase 1. The master reset 40 can be applied at any time. Thus only the desired phases have to be operated.

Mode 2: Single pixel address and digital amplitude. Three phases: 1) reset, 2) address readout and amplitude counting, and 3) amplitude readout.

Mode 2 is similar to mode 1 but the external stop signal 46 is not waited for and phase 1 is passed. The timing readout is also skipped.

Mode 3: Synchronous Counting

The mode logic 16 opens switches 22 and 23 and closes switches 21. The peak hold circuit 4 is in the "pass through" state. The comparator 5 has a fixed threshold voltage. Radiation hits creating signals exceeding the threshold voltage are recorded by the counter 7. Counter readout is performed sequentially. The readout of the counter 7 of one channel (pixel) provides the reset signal 47 to the counter 7 of the preceding channel. Thus the counting time is defined by the speed of the sequential readout (readout clock frequency) and by the number of channels (pixels).

Mode 4: Partial synchronous digital amplitude recording.

Data from a user selected region of pixels defined by implemented address logic is acquired. This mode is preferably operated in sequence with mode 1 to collect data first from a specific pixel with an event and then from the immediate neighbour pixels.

Triggered by the completion of mode 1 the mode logic 16 opens switches 22 and 23 and closes switch 21. The peak hold circuit 4 is in the "hold" state. The comparator 5 has a ramp as a threshold. The off-channel ramp generator is started simultaneously with all the counters 7. A/D conversion is thus executed in the complete pixel matrix. Counter readout is performed from a user selective region which is generally the neighborhood of the initially hit pixel.

Mode 5: Synchronous analog amplitude recording as explained above.

Modes 6 and 7: Digital Writing

Preamp 3 offset and gain trim data is written to the pixel memory elements. The mode logic 16 enables write-in through the same logic and I/O buses as in readout.

Mode 8: Synchronous digital amplitude recording as explained above. Data from the complete pixel matrix is read out sequentially.

4. Preferred Method of Application of the Photon Processing Circuit

FIG. 2 shows an imaging sensor 32 with photon processing CMOS circuits 25 according to the present invention connected by bump bonds 26 to semiconductor detector pixels 27 and mounted side by side to a common printed circuit board (PCB) 28 with necessary functionalities to operate the CMOS-detector hybrids.

Energetic photons 33 striking the detector pixels 27 are converted to electrons 34 which, as an electron charge, are driven to the pixel amplifier inputs 2 by the bias voltage supply 29. The signals induced are processed according to the operational modes described above to acquire position, energy, timing and intensity information of the radiation quanta and create images with plethora of information including positions and energy resolution as well as time information. The stop signal for the timing measurements may be acquired from amplifier 30 sensing the signal induced on the detector back electrode 31 or from any other external trigger.

The invention claimed is:

1. An Application Specific Integrated Circuit for use as a readout for one of radiation detection and radiation imaging, comprising:

plural pixel cells, each pixel cell arranged to receive an input of an electric charge from an output of a corresponding different imaging cell of a radiation imaging detector, each said pixel cell comprised of i) an input connection, the input connection for connecting to the output of the corresponding different imaging cell, said connection to receive the electric charge generated in response to incident radiation events on the detector; and ii) a circuit connected to said input connection, said circuit for receiving and processing the charge and selectively operable to perform two or more functionalities based on processing the charge, wherein each said circuit comprises a counter and a mode logic operatively connected said counter for setting said counter to perform, selectively, at least two of a) photon counting, b) analog to digital conversion of the one of the voltage amplitude and the current amplitude, and c) timing measurement of incident radiation events.

2. An Application Specific Integrated Circuit according to claim 1, wherein each said circuit further comprises a preamplifier, a peak and hold unit, a comparator, memory elements, and digital to analog converters.

3. An Application Specific Integrated Circuit according to claim 2, wherein each said circuit further comprises a voltage ramp, said voltage ramp fed into the threshold input of the comparator which compares a ramp value to an analog signal amplitude stored in the peak and hold unit and said counter is started simultaneously with the constant speed voltage ramp and said counter is stopped by the comparator when the voltage ramp reaches an analog amplitude peak thereby said counter providing a digital counter value proportional to a level of the analog signal amplitude.

4. An Application Specific Integrated Circuit according to claim 2, wherein each said counter is started by a radiation event and stopped at an appearance of an external trigger or at counter overflow and said counter is operated at constant frequency thereby providing a counter value at readout which is directly proportional to an elapsed time between the counter being started and stopped.

5. An Application Specific Integrated Circuit according to claim 1, wherein each said mode logic comprises a decoder.

6. An Application Specific Integrated Circuit according to claim 1, further comprising:
other functional units,
wherein said mode logic is further used to operate said circuit comprising the counter and said other functional units in one of i) different combinations and sequences and ii) different operational modes, in order to detect and collect multiple information of a radiation event, said multiple information including two or more of intensity, energy, position and timing data.

7. An Application Specific Integrated Circuit according to claim 1, in combination with the detector comprising a plurality of imaging cells,
each imaging cell connected to a different one of the plural pixel cells in a one-to-one correspondence.

8. An Application Specific Integrated Circuit according to claim 1, wherein,
each said circuit comprises plural output points providing the same output,
upon said circuit being selected for a first functionality, each of said plural output points providing the same first functionality output, and
upon said circuit being selected for a second functionality, each of said plural output points providing the same second functionality output.

9. A radiation device, comprising:
a detector; and
a multifunctional radiation identifying and processing application specific integrated circuit connected to said detector,
said detector comprising a plurality of individual imaging cells,
each said imaging cell generating a charge in response to incident radiation events and outputting the generated charge at a imaging cell output,
said application specific integrated circuit comprising
a different circuit connected respectively to a corresponding one of said imaging cell outputs,
each said circuit receiving and processing the generated charge received from said corresponding one imaging cell output,
each said circuit comprising
a preamplifier for generating one of a voltage amplitude and a current amplitude in response to the received charge,
a counter, and
a mode logic, operatively connected to said preamplifier and said counter, configured for setting said counter to perform, selectively, at least two of a) photon counting, b) analog to digital conversion of the one of the voltage amplitude and the current amplitude, and c) timing measurement of incident radiation events.

10. A radiation device according to claim 9, wherein,
the detector is one of a radiation detector and a radiation imaging detector.

11. A radiation device according to claim 9, wherein,
the mode logic is operatively connected to said preamplifier and said counter, and configured for setting said counter to perform, selectively, each of a) photon counting, b) analog to digital conversion of the one of the voltage amplitude and the current amplitude to digitize the energy level of each radiation event to a digital value, and c) timing measurement of incident radiation events.

* * * * *